United States Patent
Ramakrishnan (10) Patent No.: US 9,473,360 B2
(45) Date of Patent: Oct. 18, 2016

(54) SYSTEM AND METHOD FOR PRIMARY SWITCH ELECTION IN PEER GROUPS

(71) Applicant: Dell Products, L.P., Round Rock, TX (US)

(72) Inventor: Kumaresan Ramakrishnan, Chennai (IN)

(73) Assignee: Dell Products, L.P., Round Rock, TX (US)

( * ) Notice: Subject to any disclaimer, the term of this patent is extended or adjusted under 35 U.S.C. 154(b) by 240 days.

(21) Appl. No.: 14/265,140

(22) Filed: Apr. 29, 2014

(65) Prior Publication Data

US 2015/0312088 A1  Oct. 29, 2015

(51) Int. Cl.
*H04L 12/24* (2006.01)
*H04L 12/703* (2013.01)
*H04L 12/709* (2013.01)
*H04L 12/729* (2013.01)
*H04L 12/707* (2013.01)

(52) U.S. Cl.
CPC .......... *H04L 41/30* (2013.01); *H04L 41/0654* (2013.01); *H04L 41/12* (2013.01); *H04L 45/245* (2013.01); *H04L 45/28* (2013.01); *H04L 45/125* (2013.01); *H04L 45/22* (2013.01); *Y02B 60/33* (2013.01)

(58) Field of Classification Search
CPC .. H04L 1/30; H04L 41/0654; H04L 41/0663
See application file for complete search history.

(56) References Cited

U.S. PATENT DOCUMENTS

| | | | |
|---|---|---|---|
| 2012/0218907 A1* | 8/2012 | Chen | H04L 41/0893 370/252 |
| 2013/0194914 A1* | 8/2013 | Agarwal | H04L 45/245 370/225 |
| 2014/0195694 A1* | 7/2014 | Sait | H04L 45/18 709/239 |

* cited by examiner

*Primary Examiner* — Robert M Morlan
(74) *Attorney, Agent, or Firm* — Haynes and Boone, LLP (57) ABSTRACT

A system and method for primary switch election in peer groups includes a switch. The switch includes a control unit, first ports coupling the switch to a peer switch via first network links forming an inter-chassis link (ICL), and second ports coupling the switch to a plurality of first switches using a plurality of second network links. The second network links are part of a plurality of virtual link trunking (VLT) link aggregation groups (LAGs) wherein each of the VLT LAGs is associated with a respective one of the first switches. The control unit is configured to exchange dynamic election criteria with the peer switch, determine whether the switch is a primary or a secondary switch based on the exchanged dynamic election criteria, determine whether the ICL is down, and shut down the second network links when the ICL is down and the switch is the secondary switch.

16 Claims, 4 Drawing Sheets

SYSTEM AND METHOD FOR PRIMARY SWITCH ELECTION IN PEER GROUPS

BACKGROUND

The present disclosure relates generally to information handling systems, and more particularly to primary switch election in peer groups.

As the value and use of information continues to increase, individuals and businesses seek additional ways to process and store information. One option is an information handling system (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

Additionally, some embodiments of information handling systems include non-transient, tangible machine-readable media that include executable code that when run by one or more processors, may cause the one or more processors to perform the steps of methods described herein. Some common forms of machine readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Computer networks form the interconnection fabric that enables reliable and rapid communications between computer systems and data processors that are in both close proximity to each other and at distant locations. These networks create a vast spider web of intranets and internets for handling all types of communication and information. Making this possible is a vast array of network switching devices that make routing and/or forwarding decisions in order to deliver packets of information from a source system or first network node to a destination system or second network node. Due to the size, complexity, and dynamic nature of these networks, sophisticated network switching devices are often used to continuously make routing and/or forwarding decisions and to update routing and/or forwarding information as network configurations change.

To support backup and/or redundancy in computer networks, it is not uncommon for there to exist multiple paths or routes through the network between any two nodes. In some instances the parallelism is treated somewhat informally where, for example, the network switching devices communicate among themselves to identify shortest paths between two network nodes and to adjust these shortest paths when interconnections change as network links and/or network switching devices are added and/or removed and/or go up and/or go down. In some instances the parallelism is more formally treated, such as when two network switching devices are bundled into a peer group where some nearby network switching devices are coupled to both of the network switching devices in the peer group. This arrangement makes it possible so that either of the network switching devices in the peer group may forward network traffic between these nearby network switching devices. In addition, each of the network switching devices in the peer group may act as a backup network switching device for the other.

To support the peer group, the network switching devices in the peer group are typically coupled together using one or more network links that are often referred to collectively as an inter-chassis link (ICL). As long as the ICL remains up, the network switching devices in the peer group may monitor the status of each other and act as a backup device for the other network switching device when the other network switch device goes down. To account for the possibility that the ICL may go down, the network switching devices in the peer group may often elect one of the network switches devices to become a primary network switching device and the other to become a secondary network switching device. When the primary and secondary network switching devices detect a failure in the ICL, a common approach is to have the secondary network switching device shut down its network links with the nearby network switching devices and allow the primary network switching device to forward network traffic on behalf of the peer group. Unfortunately, many mechanisms for electing the primary and secondary network switching devices are static and do not generally take into account conditions in the peer group just before the ICL goes down. As a result, the static election mechanism does not always make the best decision for the primary and secondary network switching devices.

Accordingly, it would be desirable to provide improved methods and systems for electing primary and secondary network switching devices in peer groups.

SUMMARY

According to one embodiment, a network switching device includes a control unit, one or more first ports coupling the network switching device to a peer network switching device via one or more first network links, and a plurality of second ports coupling the network switching device to a plurality of first network switching devices using a plurality of second network links. The first network links form an inter-chassis link (ICL). The second network links are part of a plurality of virtual link trunking (VLT) link aggregation groups (LAGs) wherein each of the VLT LAGs is associated with a respective one of the first network switching devices. The control unit is configured to exchange dynamic election criteria with the peer network switching device, determine whether the network switching device is a primary network switching device or a secondary network switching device based on the exchanged dynamic election criteria, determine whether the ICL is down, and shut down the second network links when the ICL is down and the network switching device is the secondary network switching device.

According to another embodiment, a method of managing a switch includes periodically exchanging dynamic election criteria with a peer switch coupled to the switch via an ICL, periodically determining whether the switch is a primary switch or a secondary switch based on the exchanged dynamic election criteria, determining whether the ICL is down, and shutting down a plurality of network links when the ICL is down and the switch is the secondary switch. The network links are part of a plurality of VLT LAGs wherein each of the VLT LAGs is associated with a respective first switch.

According to yet another embodiment, an information handling system includes a peer group. The peer group includes a first switch, a second switch, and an ICL coupling the first switch and the second switch. The first switch is coupled to a plurality of third switches using a plurality of first network links, the first network links being organized into a plurality of VLT LAGs wherein each of the VLT LAGs is associated with a respective one of the third switches. The second switch is coupled to the third switches using a plurality of second network links, each of the second network links being included in a corresponding one of the VLT LAGs. The first switch and the second switch are configured to exchange one or more bandwidth capacities associated with the first network links and the second network links, elect one of the first switch and the second switch as a secondary switch based on the exchanged bandwidth capacities, and determine whether the ICL is down. When the ICL is down and the first switch is the secondary switch, the first switch is further configured to shut down the first network links. When the ICL is down and the second switch is the secondary switch, the second switch is further configured to shut down the second network links.

BRIEF DESCRIPTION OF THE DRAWINGS

In the figures, elements having the same designations have the same or similar functions.

DETAILED DESCRIPTION

In the following description, specific details are set forth describing some embodiments consistent with the present disclosure. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

For purposes of this disclosure, an IHS may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an IHS may be a personal computer, a PDA, a consumer electronic device, a display device or monitor, a network server or storage device, a switch router or other network communication device, or any other suitable device and may vary in size, shape, performance, functionality, and price. The IHS may include memory, one or more processing resources such as a central processing unit (CPU) or hardware or software control logic. Additional components of the IHS may include one or more storage devices, one or more communications ports for communicating with external devices as well as various input and output (I/O) devices, such as a keyboard, a mouse, and a video display. The IHS may also include one or more buses operable to transmit communications between the various hardware components.

Figure 1:
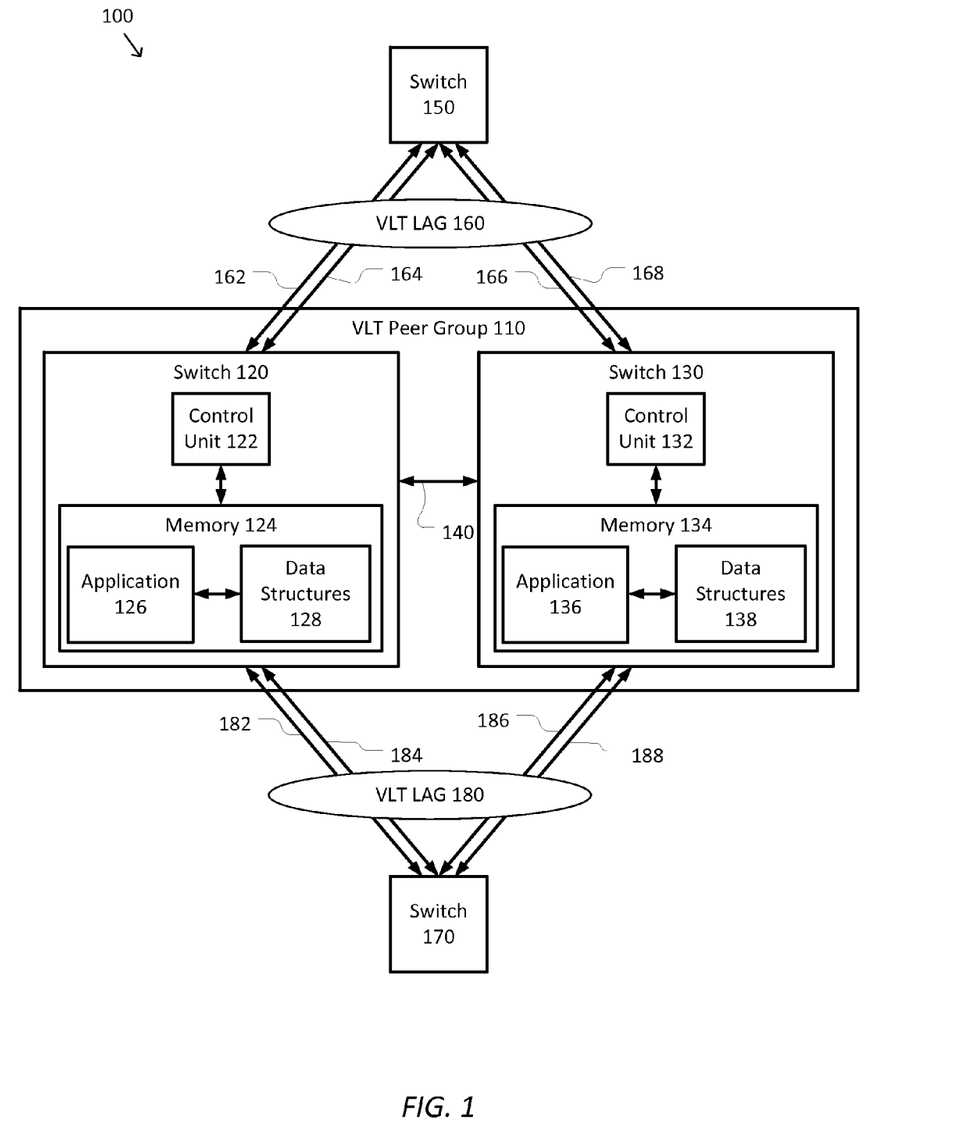
FIG. 1 is a simplified diagram of a network according to some embodiments.

FIG. 1 is a simplified diagram of a network 100 according to some embodiments. As shown in FIG. 1, network 100 includes a pair of network switching devices or switches 120 and 130 configured as a virtual link trunking (VLT) peer group 110. Switches 120 and 130 are considered to be peers to each other and provide both parallelism and redundancy to the routing and/or forwarding functions by acting in cooperation. In some examples, both of the switches 120 and 130 may be separately coupled to nearby switches and/or switches, such as switches 150 and 170, using network links. In some examples, each of the network links is coupled to a respective network port in switch 120 and/or 130. Because switches 150 and 170 are coupled to both switches 120 and 130, switches 150 and 170 may use either switch 120 or switch 130 to exchange network traffic. This parallelism may increase the bandwidth available between switches 150 and 170, and it may also provide redundancy that allows network traffic to move between switches 150 and 170 even when either of switches 120 or 130 goes down and/or one of the network links goes down. Switches 120 and 130 may also exchange management information between themselves, such as routing and forwarding tables, status information, and/or the like so that switches 120 and/or 130 are ready to provide backup for the other.

As shown in FIG. 1, switch 120 includes a control unit 122 coupled to memory 124 and switch 130 includes a control unit 132 coupled to memory 134. Each of control units 122 and/or 132 may control the operation of its respective switch 120 and/or 130. In some examples, control units 122 and/or 132 may each include one or more processors, central processing units, virtual machines, microprocessors, microcontrollers, application specific integrated circuits (ASICs), field programmable gate arrays (FPGAs), digital signal processors (DSPs), and/or the like.

Memory 124 may be used to store one or more applications 126 and one or more data structures 128. Similarly, memory 134 may be used to store one or more applications 136 and one or more data structures 138. In some examples, the one or more data structures 128 and/or 138 may include routing and forwarding tables such as one or more virtual LAN tables, link aggregation group (LAG) tables, layer 1 (L2) next hop tables, layer 3 (L3) routing tables, L3 forwarding information bases (FIBs), flow tables, and/or the like to support the management and/or forwarding functions of the one or more applications 126 and/or 136. Memories 124 and/or 134 may each include one or more types of machine readable media. Some common forms of machine readable media may include floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Switches 120 and 130 are also coupled to each other using one or more network links often referred to as an inter-chassis link (ICL) 140. In some examples, each of the network links is coupled to switches 120 and 130 using a respective network port or port of switches 120 and/or 130. In some examples, the network links of ICL 140 are often treated as a single routing or forwarding link aggregation group (LAG). This allows control units 122 and/or 132 to forward network traffic between switches 120 and 130 using any of the networks links in ICL 140 by designating delivery of the network traffic using a destination address that identifies ICL 140. In some examples, both switches 120 and 130 may include a LAG hashing mechanism that selects from any of the network links in ICL 140 when network traffic is forwarded to the ICL using the LAG. Switches 120 and 130 may also exchange management, routing, forwarding, and/or other information using ICL 140.

To better take advantage of the parallelism and/or redundancy provided by VLT peer group 110, switches 150 and 170 may also use LAGs when routing and/or forwarding network traffic using VLT peer group 110. As shown, switch 150 may use a VLT LAG 160 to bundle together network links 162 and 164 coupling switch 150 to switch 120 and network links 166 and 168 coupling switch 150 to switch 130. Rather than making decisions about whether to route network traffic to either switch 120 or 130, switch 150 may route and/or forward network traffic to VLT LAG 160 and allow the LAG hashing mechanism of VLT LAG 160 to select between any of the network links 162-168. This allows switch 150 to direct network traffic to switch 170 without worrying about whether it is forwarded through switch 120 or 130. Similarly, switch 170 may use a VLT LAG 180 to bundle together network links 182 and 184 coupling switch 170 to switch 120 and network links 186 and 188 coupling switch 170 to switch 130. Although each of the network segments between switches 150 and 170 and switches 120 and 130 are shown having two parallel network links each (network links 162 and 164, 166 and 168, 182 and 184, and 186 and 188), one of ordinary skill would understand that any number of network links may be used in the network segments between switches 150 and 170 and switches 120 and 130.

As switches 120 and 130 receive and forward network traffic in network 100, they may share information with each other related to the topology and/or configuration of network 100. In some examples, the shared information may include information related to the status and/or configuration of ICL 140 that may be shared using protocols such as the Link Layer Discovery Protocol (LLDP), the Link Aggregation Control Protocol (LACP), and/or the like. In some examples, the shared information may include status information of switches 120 and/or 130. In some examples, the status information may include the status of VLT LAGs 160 and/or 180 and/or any of the network links 162-168 and/or 182-188. In some examples, the shared information may include routing and/or forwarding information related to network 100, such as network addresses and/or hop counts to other switches and network nodes reachable from either switch 120 and/or 130. In some examples, switches 120 and/or 130 may use the shared information to monitor the status of the other as well as to be prepared to back up the other in the event that either switch 120 and/or 130 go down and/or are unable to forward network traffic.

Among the backup and/or redundancy contingencies that are typically accounted for between switches 120 and 130 in VLT peer group 110 are how to respond when ICL 140 goes down. Although it is possible for both switches 120 and 130 to separately continue to forward network traffic between switches 150 and 170, this is not generally done. In some examples, when ICL 140 is down, switches 120 and 130 are not able to share information with each other and their respective abilities to provide backup and/or redundancy for the other may become unstable. In some examples, switch 120 and/or 130 may be coupled to other switches and/or devices (not shown) via network links that are not part of VLT LAGs such as VLT LAGs 160 and/or 180. When ICL 140 is down, switches 120 and/or 130 are not able to use ICL 140 to forward network traffic over ICL 140 to the other so that network traffic for one of these other switches and/or devices that is hashed to the wrong one of switches 120 or 130 may not be adequately forwarded. A common solution to address this problem includes having switches 120 and 130 agree in advance of ICL 140 going down, which of switches 120 and 130 (i.e., the primary switch) will continue to provide forwarding over VLT LAGs 160 and/or 180 and which of switches (i.e., the secondary switch) will shut down its network links with VLT LAGs 160 and 180 so that network traffic is forwarded through the primary switch.

Figure 2:
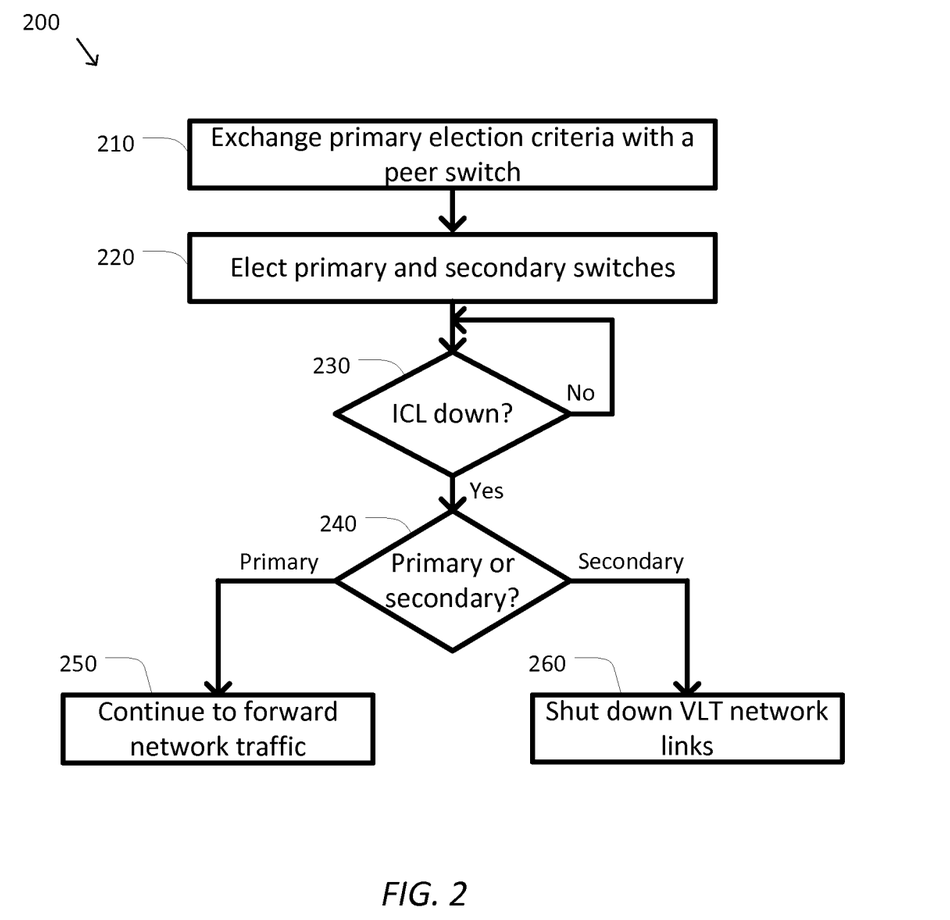
FIG. 2 is a simplified diagram of a method of primary and secondary switch management in a peer group according to some embodiments.

FIG. 2 is a simplified diagram of a method 200 of primary and secondary switch management in a peer group according to some embodiments. In some embodiments, one or more of the processes 210-260 of method 200 may be implemented, at least in part, in the form of executable code stored on non-transient, tangible, machine readable media that when run by one or more processors (e.g., the one or more processors of control units 122 and/or 132) may cause the one or more processors to perform one or more of the processes 210-260. In some embodiments, method 200 may be performed in a switch that is part of a VLT peer group, such as switch 120 and/or 130, and/or by a management application, such as application 126 and/or 136.

At a process 210, primary election criteria are exchanged with a peer switch. In order for both switches in a peer group to agree on which of the switches is to become the primary switch and which of the switches is to become the secondary switch, they may exchange suitable criteria for electing the primary and secondary switches. In some examples, the switches in the peer group may exchange one or more messages with suitable election criteria. In some examples, the election criteria may be exchanged using one or more network messages and/or network packets whose primary purpose is to exchange the election criteria. In some examples, the election criteria may be determined based on information included in network messages and/or network packets exchanged by the switches for other purposes, such as network messages and/or network packets exchanged to manage other functions of the peer group. In some examples, the election criteria may include one or more internet protocol (IP) addresses, medium access control (MAC) addresses, switch identifiers, and/or the like associated with the switches in the peer group.

At a process 220, the primary and secondary switches are elected. Using the election criteria exchanged during process 210, each of the switches in the peer group determines whether it is the primary switch or the secondary switch. In some examples, the switch may determine whether it is the primary switch or the secondary switch based on a comparison of its election criteria with the election criteria of its peer switch. In some examples, when the election criteria is associated with IP addresses, MAC addresses, switch identifiers, and/or the like, the primary switch may be elected as the switch with the lower address and/or identifier and the secondary switch as the switch with the higher address and/or identifier. In some examples, the switch with the higher address and/or identifier may be elected as the primary switch and the switch with the lower address and/or identifier may be elected as the secondary switch.

At a process 230, it is determined whether the ICL is down. Each of the switches in the peer group typically include hardware and/or software for monitoring the status of each of the network links used to couple the respective switch to other switches and/or devices. In some examples, the network links may include the network links in ICL 140. In some examples, the monitoring hardware may determine that a network link in the ICL may be down based on the loss of signaling levels and/or the like on the network link. In some examples, the switch may determine that the network link is down due to the loss of network traffic and/or network packets associated with network link management protocols, such as LLDP, LACP, and/or the like. In some examples, one or more network packets associated with the network link management protocols may indicate that the network link is down. In some examples, the switch may determine that the ICL is down when each of the network links that form the ICL are respectively down. When the ICL is down, the primary and secondary switch roles are activated beginning with a process 240. When the ICL is not down, the status of the ICL is determined again by repeating process 230. In some examples, a time delay may occur between successive determinations of the ICL status using process 230.

At the process 240, it is determined whether the switch is the primary switch or the secondary switch. The switch may determine whether it is the primary switch or the secondary switch based on the results of the primary switch election during process 220. When the switch is the primary switch, the switch continues its forwarding operations using a process 250. When the switch is the secondary switch, it shuts down its VLT network links using a process 260.

At the process 250, network traffic continues to be forwarded. When the switch is the primary switch, it continues its forwarding function even when the ICL is down. In some examples, the primary switch may continue to receive network traffic on VLT LAGs, such as VLT LAGs 160 and/or 180, on behalf of the peer group and forward network traffic using the VLT LAGs. In some examples, the primary switch may continue to forward network traffic using process 250 until the ICL comes back up and more complete function of the peer group returns.

At the process 260, VLT network links are shut down. When the switch is the secondary switch, it shuts down each of its network links that are part of VLT LAGs. In some examples, each of the network links may be shut down by shutting down corresponding network ports coupled to those network links. In some examples, the secondary switch may shut down the VLT network links by exchanging one or more management messages and/or network packets with the switches coupled to the switch by the VLT network links. In some examples, shutting down each of the VLT network links includes shutting down the network links to forwarded network traffic. In some examples, management network traffic may continue to be exchanged on the VLT network links to support bringing the VLT network links back up for forwarded network traffic at a later time. In the examples of FIG. 1, when the switch 130 is the secondary switch, the network links 166, 168, 186, and 188 would be shut down by process 260. In some examples, shutting down the VLT network links includes removing the VLT network links from any corresponding VLT LAGs, such as VLT LAGs 160 and/or 180, so that the LAG hashing mechanisms of those VLT LAGs does not hash future network traffic for the peer group to the secondary switch. In some examples, the VLT network links remain down until the ICL comes back up and more complete function of the peer group returns. In some examples, while the network links are shut down, link management traffic may continue to be exchanged on each of the shutdown network links.

The primary and secondary switch management of method 200 provides a generally straight-forward approach for handling the situation where the ICL of a peer group goes down. The static election of the primary and secondary switch during process 220, however, may elect the primary and secondary switches in a way that is not always the most sensible. One possible limitation in the static election process may be observed in the context of the example network 100 in FIG. 1, where both of the switches 120 and 130 are performing their respective instances of method 200. Consider the scenario where switches 120 and 130 exchange MAC addresses during process 210 and switch 120 is elected as the primary switch and switch 130 is elected as the secondary switch based on the MAC addresses. While network 100 is fully up and functional, there is no general reason why this election of switch 120 as the primary switch is any better or worse than electing switch 130 as the primary switch. Operation of network 100, however, is dynamic and may be subject to change as, for example, one or more of the network links goes down.

For purposes of illustration, consider the case where network link 184 goes down and the network bandwidth between switch 120 and switch 170 is correspondingly reduced. Should ICL 140 go down while network link 184 is down, the election of switch 120 as the primary switch for VLT peer group 110 may turn out to be poor choice. This is because once ICL 140 goes down, switch 130 will shut down network links 166, 168, 186, and 188 because they are VLT network links and switch 130 is the secondary switch. As a result, the amount of bandwidth remaining between switches 150 and 170 using VLT peer group 110 is limited by the lesser of the bandwidth of network link 182 and the combined bandwidth of network links 162 and 164. Under the assumption that each of the network links to and from VLT peer group 110 is the same (i.e., the bandwidths of network links 162-168 and 182-188 are the same), the available bandwidth through VLT peer group 110 is half of what it would be had switch 130 been elected as the primary switch instead. This indicates that it may be more advantageous to dynamically elect switch 130 as the primary switch when ICL 140 goes down because switch 130 may support more bandwidth through VLT peer group 110 than switch 120 due to the current down state of network link 184. Other network configurations, such as square VLT configurations may be even more vulnerable to static election approaches for the primary and secondary switches.

Figure 3:
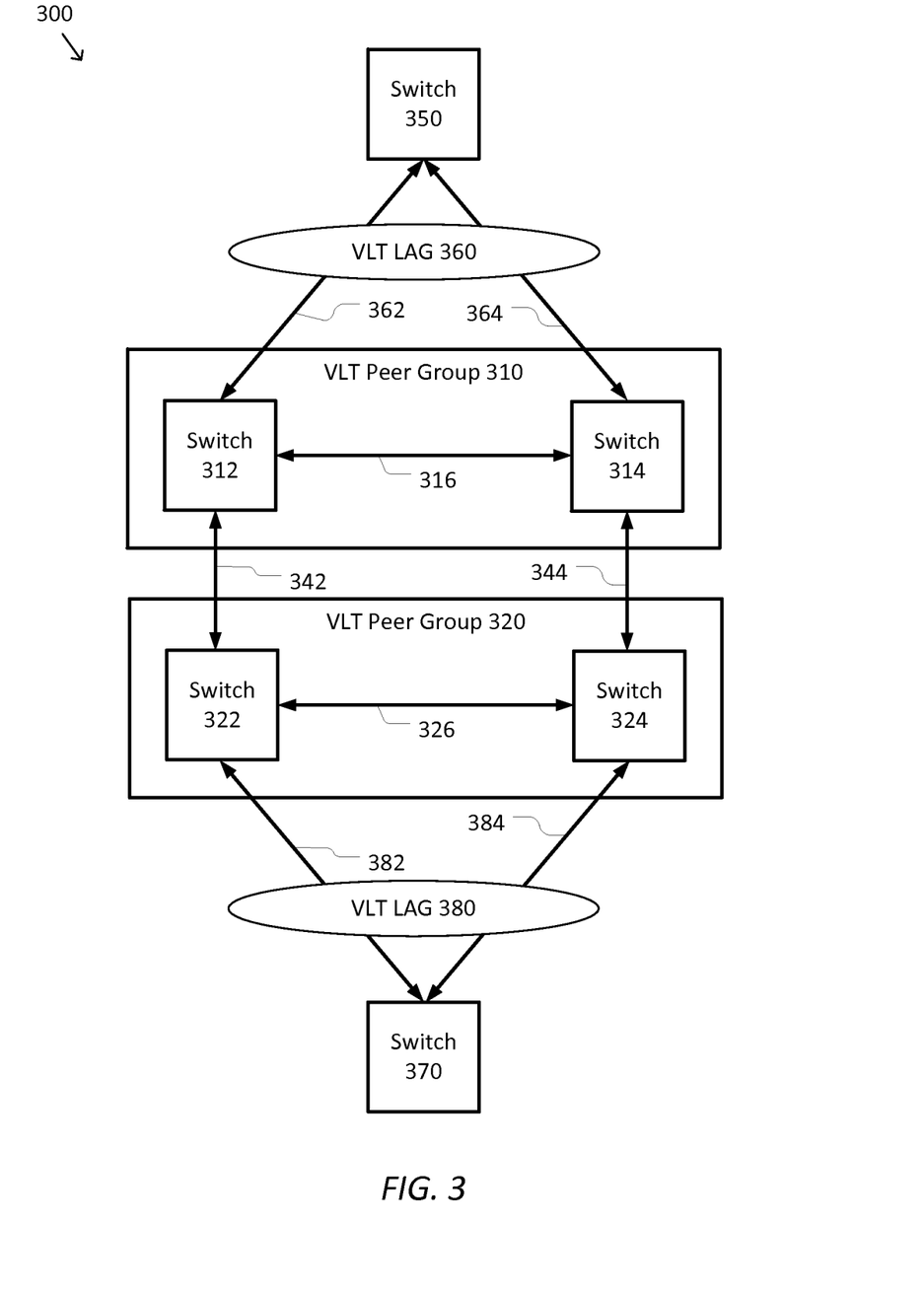
FIG. 3 is a simplified diagram of another network according to some embodiments.

FIG. 3 is a simplified diagram of a network 300 according to some embodiments. As shown in FIG. 3, network 300 includes two VLT peer groups 310 and 320 in a square VLT configuration. VLT peer group 310 includes a switch 312 and a switch 314 coupled to each other using an ICL 316 that may contain one or more network links. Similarly, VLT peer group 320 includes a switch 322 and a switch 324 coupled to each other using an ICL 326 that may contain one or more network links. VLT peer groups 310 and 320 are further coupled to each other by one or more network links 342 coupling switch 312 to switch 322 and one or more network links 344 coupling switch 314 to switch 324. Together VLT peer groups 310 and 320 form a square VLT configuration due to the characteristic square topological configuration among switches 312, 314, 322, and 324. In some examples, network links 342 and/or 344 may also be included in one or more VLT LAGS between VLT peer group 310 and VLT peer group 320. In some examples, each of the switches 312, 314, 322, and/or 324 may be similar to switches 120 and/or 130 and include corresponding control units, memories, applications, and/or data structures. Each of switches 312, 314, 322, and/or 324 may also perform method 200.

Switches external to VLT peer groups 310 and 320 may take advantage of the parallelism and redundancy provided by VLT peer groups 310 and 320. FIG. 3 shows two examples of such switches. A switch 350 is shown coupled to VLT peer group 310 using a VLT LAG 360. VLT LAG 360 includes one or more network links 362 coupling switch 350 to switch 312 and one or more network links 364 coupling switch 350 to switch 314. Similarly, a switch 370 is shown coupled to VLT peer group 320 using a VLT LAG 380. VLT LAG 380 includes one or more network links 382 coupling switch 370 to switch 312 and one or more network links 384 coupling switch 370 to switch 324. Network traffic between switches 350 and 370 may be forwarded through the combination of VLT peer groups 310 and 320. In some examples, network traffic may be exchanged using switches 312 and 322 or using switches 314 and 324 depending upon how the network traffic is initially hashed by VLT LAG 360 and/or 380. In some examples ICL 316 and/or 326 may also be used to provide additional parallelism and/or redundancy in network paths through network 300.

Use of the static election processes of method 200 in switches 312, 314, 322, and/or 324 may further expose limitations in the ability of method 200 to appropriately elect primary and secondary switches in peer groups. Consider the scenario where switches 312 and 314 exchange primary election criteria, such as MAC addresses, using respective instances of process 210 and then elect switch 312 as the primary switch and switch 314 as the secondary switch of VLT peer group 310 using respective instances of process 220. As part of the same scenario assume that switches 322 and 324 exchange primary election criteria using respective instances of process 210 and then elect switch 324 as the primary switch and switch 322 as the secondary switch of VLT peer group 320 using respective instances of process 220. On the surface everything appears to be OK. For example, when ICL 316 goes down, switch 312, as the primary switch of VLT peer group 310, continues to forward network traffic between switch 350 and switch 322 on behalf of VLT peer group 310 and switch 314, as the secondary switch of VLT peer group 310, shuts down network links 364 and 344. Absent any bandwidth concerns identified previously in the examples of network 100, the election of switch 312 as the primary switch of VLT peer group 310 appears to be acceptable.

Now further assume that ICL 326 also goes down. When this occurs, switch 324, as the primary switch of VLT peer group 320, keeps network links 384 up and tries to continue to forward network traffic between switch 370 and switch 314 on behalf of VLT peer group 320 and switch 322, as the secondary switch of VLT peer group 320, shuts down network links 342 and 382. Unfortunately, the network links shut down as part of the respective instances of process 260 have eliminated the ability of VLT peer groups 310 and 320 to forward network traffic between switches 350 and 370. To summarize, ICLs 316 and 326 are down, switch 314 as the secondary switch of VLT peer group 310 has shut down network links 364 and 344, and switch 322 as the secondary switch of VLT peer group 320 has shut down network links 342 and 382. As a result, there is no longer a forwarding path through VLT peer groups 310 and 320 even though each of the four switches 312, 314, 322, and 324 remain up, as just network links 362 and 384 remain up. If instead a more dynamic primary switch election process is used, switches 322 and 324 could change the election so that switch 322 becomes the primary switch for VLT peer group 320 after switch 314 shuts down network links 344. When this is allowed to occur, a network path through VLT peer groups 310 and 320 would remain as network traffic between switches 350 and 370 may use switches 312 and 322 along with network links 362, 342, and 382.

Figure 4:
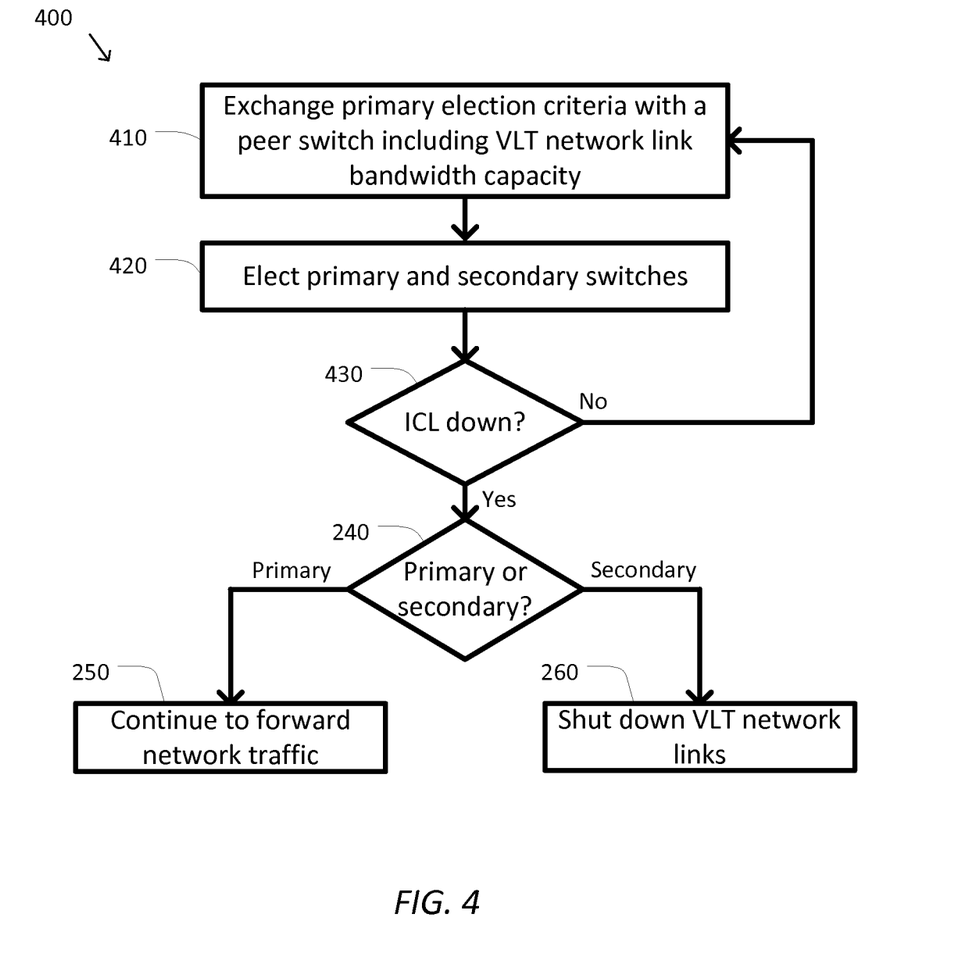
FIG. 4 is a simplified diagram of another method of primary and secondary switch management in a peer group according to some embodiments.

FIG. 4 is a simplified diagram of a method 400 of primary and secondary switch management in a peer group according to some embodiments. In some embodiments, one or more of the processes 410-430 and 240-260 of method 400 may be implemented, at least in part, in the form of executable code stored on non-transient, tangible, machine readable media that when run by one or more processors (e.g., the one or more processors of control units 122 and/or 132) may cause the one or more processors to perform one or more of the processes 410-430 and 240-260. In some embodiments, method 400 may be performed in a switch that is part of a VLT peer group, such as switch 120, 130, 312, 314, 322, and/or 324, and/or by a management application, such as application 126 and/or 136.

At a process 410, primary election criteria are exchanged with a peer switch including VLT network link bandwidth capacity. In order for both switches in a peer group to agree on which of the switches is to become the primary switch and which of the switches is to become the secondary switch, they may exchange suitable criteria for electing the primary and secondary switches. In some examples, the switches in the peer group may exchange one or more messages with suitable election criteria. In some examples, the election criteria may be exchanged using one or more network messages and/or network packets whose primary purpose is to exchange the election criteria. In some examples, the election criteria may be determined based on information included in network messages and/or network packets exchanged by the switches for other purposes, such as network messages and/or network packets exchanged to manage the peer group. In some examples, the election criteria may include one or more internet protocol (IP) addresses, medium access control (MAC) addresses, switch identifiers, and/or the like associated with the switches in the peer group.

Rather than rely on static election criteria, such as the addresses and/or identifiers, the switches may exchange dynamic election criteria, such as bandwidth capacity in their respective VLT network links. In some examples, the switches may exchange one or more messages describing the bandwidth capacity of each of the VLT network links coupled to the switches. In some examples, a VLT network link that is shutdown may have a bandwidth capacity of zero. In some examples, a VLT network link that is up may have a bandwidth capacity equal to the maximum bandwidth sustainable by the VLT network link. In some examples, the bandwidth capacity of a network link may be based on one or more bandwidth allocations for the VLT network link. In some examples, the switches may exchange one or more aggregate bandwidth capacities associated with each of the VLT LAGS that may be used to forward traffic to or from the switches. In some examples, the aggregate bandwidth may be a total of the bandwidth capacities for each of the network links associated with the corresponding VLT LAG. In some examples, the switches may exchange one or more aggregate bandwidth capacities associated with the switch as a whole.

At a process 420, the primary and secondary switches are elected. Using the election criteria exchanged during process 410, each of the switches in the peer group determines whether it is the primary switch or the secondary switch. In some examples, the switch may determine whether it is the primary switch or the secondary switch based on a comparison of its election criteria with the election criteria of its peer switch. In some embodiments, the bandwidth capacities exchanged during process 410 may be used as criteria for electing the primary switch and the secondary switch. In some examples, the switch with the highest bandwidth capacity may be elected as the primary switch and the switch with the lowest bandwidth capacity may be elected as the secondary switch. In some examples, the aggregate bandwidth capacities for each switch as a whole may be compared to determine the primary and second switches. In some examples, the primary and secondary switches may be elected by determining the smallest aggregate bandwidth capacity associated with each of the VLT LAGs from each of the switches and then comparing those two values. In this way, the switch with the VLT LAG with the smallest aggregate bandwidth may be elected as the secondary switch under the assumption that it may provide the greatest bottle neck when forwarding network traffic through the peer group. In some examples, combinations of aggregate bandwidth capacities associated with the switches as a whole, for VLT LAGs, and/or the like may be used to elect the primary switch. In some examples, other aggregations, such as averages, medians, modes, and/or the like may be used as well. In some embodiments, when the VLT network link bandwidth capacities of the two switches result in a tie, static election criteria may be used to break the tie. In some examples, the addresses, identifiers, and/or the like may be used as the static election criteria to break the tie.

At a process 430, it is determined whether the ICL is down. Each of the switches in the peer group typically include hardware and/or software for monitoring the status of each of the network links used to couple the respective switch to other switches and/or devices. In some examples, the network links may be included the network links in ICL 140, 316, and/or 326. In some examples, the monitoring hardware may determine that a network link in the ICL may be down based on the loss of signaling levels and/or the like on the network link. In some examples, the switch may determine that the network link is down due to the loss of network traffic and/or network packets associated with network link management protocols, such as LLDP, LACP, and/or the like. In some examples, one or more network packets associated with the network link management protocols may indicate that the network link is down. In some examples, the switch may determine that the ICL is down when each of the network links that form the ICL are respectively down. When the ICL is down, the primary and secondary switch roles are activated beginning with the process 240. When the ICL is not down, the primary election criteria are re-exchanged by returning to process 410. In some examples, a time delay may occur before returning to process 410.

Processes 240, 250, and/or 260 may be substantially similar to those included in method 200. Depending upon whether the switch is the primary switch or the secondary switch, the switch either continues to forward network traffic or shuts down each of its VLT network links.

Replacing method 200 with method 400 in switches 120, 130, 312, 314, 322, and/or 324 may reduce and/or solve the issues previously noted in the static election criteria when applied to networks 100 and/or 300. Referring back to the examples of FIG. 1, when each of the network links 162-168 and 182-188 have the same bandwidth capacity and each of the network links 162-168 and 182-188 are up, absent other criteria it likely does not matter whether switch 120 or switch 130 is elected as the primary switch for VLT peer group 110. This is because both switch 120 and switch 130 may have the same VLT network bandwidth capacity when determined either in aggregate for switches 120 and 130 as a whole, or by considering the VLT LAG with the smallest bandwidth capacity. In this case, a tie breaker based on static election criteria may elect either switch 120 or switch 130 as the primary switch. However, when network link 184 goes down, the aggregate bandwidth capacity for switch 120 as a whole is lower than the aggregate bandwidth capacity for switch 130 making switch 130 the more logical choice to elect as the primary switch. The same conclusion may be reached when the VLT LAG with the smallest aggregate bandwidth capacity is used to make the election because VLT LAG 180 has the smallest aggregate bandwidth capacity for switch 120 and it is lower than the aggregate bandwidth capacity for both VLT LAGS 160 and 180 for switch 130.

Referring back to the examples of FIG. 3. When ICL 316 goes down, absent other criteria it likely does not matter whether switch 312 or switch 314 is elected as the primary switch for VLT peer group 310. Under the assumption that the static election criteria tie breaker elects switch 312 as the primary switch and switch 314 as the secondary switch for VLT peer group 310, switch 314 shuts down network links 364 and 344. As a result, the VLT network link bandwidth capacity for switch 324 drops, both in aggregate for switch 324 as a whole and by VLT LAG with the smallest aggregate bandwidth capacity. Thus, switch 322 is dynamically elected as the primary switch for VLT peer group 320 so that when ICL 326 goes down, switch 322 continues to forward network traffic, and a network path through VLT peer groups 310 and 320 for switches 350 and 370 remains available using switches 312 and 322 (the two primary switches) and network links 362, 342, and 382.

Accordingly, the use of method 400 in place of method 200 in switches 120, 130, 312, 314, 322, and/or 324 results in improved network response and/or function when one or more of the ICLs 140, 316, and/or 326 goes down.

As discussed above and further emphasized here, FIG. 4 is merely an example which should not unduly limit the scope of the claims. One of ordinary skill in the art would recognize many variations, alternatives, and modifications. In some embodiments, dynamic election criteria other than VLT network link bandwidth capacity may be used to elect the primary and secondary switches. In some examples, the dynamic election criteria may include counts of a number of VLT network links that are up in the respective switches of the peer group. In some examples, the dynamic election criteria may include processor and/or memory utilization of the respective switches so that the less busy of the respective switches may be elected as the primary switch. In some examples, the dynamic election criteria may include one or more measures of latency when forwarding network traffic through the respective switches. In some examples, combinations of two or more dynamic criteria may be used in the election process. In some examples, the combinations may include generating one or more weighted sums of dynamic criteria, a cascading tier of comparisons between dynamic criteria, and/or the like.

Some embodiments of switches 120, 130, 312, 314, 322, and/or 324 may include non-transient, tangible, machine readable media that include executable code that when run by one or more processors (e.g., one or more processors in control units 122 and/or 132) may cause the one or more processors to perform the processes of methods 200 and/or 400 as described above. Some common forms of machine readable media that may include the processes of methods 200 and/or 400 are, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

What is claimed is:

1. A network switching device, the device comprising:
   a controller;
   one or more first ports coupling the network switching device to a peer network switching device via one or more first network links, the first network links forming an inter-chassis link (ICL); and
   a plurality of second ports coupling the network switching device to a plurality of first network switching devices using a plurality of second network links, the second network links being part of a plurality of virtual link trunking (VLT) link aggregation groups (LAGs) wherein each of the VLT LAGs is associated with a respective one of the first network switching devices;
   wherein the controller is configured to:
      exchange dynamic election criteria with the peer network switching device;
      determine whether the network switching device is a primary network switching device or a secondary network switching device based on the exchanged dynamic election criteria, wherein when the exchanged dynamic election criteria does not allow the controller to determine whether the network switching device is the primary network switching device or the secondary network switching device, exchange static election criteria with the peer network switching device and determine whether the network switching device is the primary network switching device or the secondary network switching device based on the exchanged static election criteria;
      determine whether the ICL is down; and
      shut down the second network links when the ICL is down and the network switching device is the secondary network switching device.

2. The device of claim 1, wherein the exchanged dynamic election criteria includes one or more bandwidth capacities associated with the VLT LAGs.

3. The device of claim 2, wherein the controller determines that-the network switching device is the primary network switching device when the bandwidth capacities associated with the network switching device are higher than the bandwidth capacities associated with the peer network switching device.

4. The device of claim 2, wherein the controller determines the network switching device is the primary network switching device when an aggregation of the bandwidth capacities associated with the network switching device are higher than an aggregation of the bandwidth capacities associated with the peer network switching device.

5. The device of claim 2, wherein the controller determines that the network switching device is the primary network switching device when a lowest one of the bandwidth capacities associated with the network switching device and a first one of the VLT LAGs is higher than a lowest one of the bandwidth capacities associated with the peer network switching device and a second one of the VLT LAGs.

6. The device of claim 1, wherein shutting down the second network links further includes shutting down the second ports by the controller.

7. The device of claim 1, wherein link management network traffic is exchanged after shutting down the second network links.

8. The device of claim 1, wherein the exchanged static election criteria includes one or more selected from a group consisting of medium access control addresses, internet protocol addresses, and network switching device identifiers.

9. The device of claim 1, wherein the exchanged dynamic election criteria includes one or more selected from a group consisting of counts of a number of second network links that are up, processor utilizations, memory utilizations, and latency measures.

10. The device of claim 1, wherein the controller is further configured to:
    exchange additional dynamic election criteria with the peer network switching device; and
    determine whether the network switching device is the primary network switching device or the secondary network switching device further based on the additional exchanged dynamic election criteria.

11. A method of managing a switch, the method comprising:
    periodically exchanging dynamic election criteria with a peer switch coupled to the switch via an inter-chassis link (ICL), wherein exchanging dynamic election criteria comprises exchanging one or more bandwidth capacities associated with network links;
    periodically determining whether the switch is a primary switch or a secondary switch based on the exchanged dynamic election criteria, wherein when the exchanged dynamic election criteria does not allow the determination of the switch, exchanging static election criteria with the peer switch and determining whether the switch is the primary switch or the secondary switch based on the exchanged static election criteria, and wherein the exchanged static election criteria includes one or more selected from a group consisting of medium access control addresses, internet protocol addresses, and network switching device identifiers;
    determining whether the ICL is down; and
    shutting down a plurality of network links when the ICL is down and the switch is the secondary switch, wherein the plurality of network links are part of a plurality of virtual link trunking (VLT) link aggregation groups (LAGS), and wherein each of the VLT LAGS is associated with a respective first switch.

12. The method of claim 11, wherein determining whether the switch is the primary switch or the secondary switch comprises determining whether the bandwidth capacities associated with the switch are higher than the bandwidth capacities associated with the peer switch.

13. The method of claim 11, wherein determining whether the switch is the primary switch or the secondary switch comprises determining whether an aggregation of the bandwidth capacities associated with the switch are higher than an aggregation of the bandwidth capacities associated with the peer switch.

14. The method of claim 11, wherein determining whether the switch is the primary switch or the secondary switch comprises determining whether a lowest one of the bandwidth capacities associated with the switch and a first one of the VLT LAGs is higher than a lowest one of the bandwidth capacities associated with the peer switch and a second one of the VLT LAGs.

15. An information handling system comprising:
a peer group comprising:
  a first switch;
  a second switch; and
  an inter-chassis link (ICL) coupling the first switch and the second switch;
wherein:
  the first switch is coupled to a plurality of third switches using a plurality of first network links, the first network links being organized into a plurality of virtual link trunking (VLT) link aggregation groups (LAGs) wherein each of the VLT LAGs is associated with a respective one of the third switches;
  the second switch is coupled to the plurality of third switches using a plurality of second network links, each of the second network links being included in a corresponding one of the VLT LAGs;
  the first switch and the second switch are configured to:
    exchange one or more bandwidth capacities associated with the first network links and the second network links;
    elect one of the first switch and the second switch as a secondary switch based on the exchanged bandwidth capacities, wherein when the exchanged bandwidth capacities does not allow the election of the secondary switch, exchange static election criteria and elect one of the first switch and the second switch as the secondary switch further based on the exchanged static election criteria, and wherein the exchanged static election criteria includes one or more selected from a group consisting of medium access control addresses, interne protocol addresses, and switch identifiers;
    determine whether the ICL is down;
    when the ICL is down and the first switch is the secondary switch, the first switch is further configured to shut down the first network links; and
    when the ICL is down and the second switch is the secondary switch, the second switch is further configured to shut down the second network links.

16. The information handling system of claim 15 wherein the first switch and the second switch are further configured to elect the second switch as the secondary switch based on whether an aggregate bandwidth capacity associated with the first network links is larger than an aggregate bandwidth capacity associated with the second network links.

* * * * *